United States Patent [19]
Takagi

[11] Patent Number: 5,919,108
[45] Date of Patent: Jul. 6, 1999

[54] HYDRAULIC CONTROL APPARATUS FOR AUTOMATIC TRANSMISSION

[75] Inventor: Kiyoharu Takagi, Okazaki, Japan

[73] Assignee: Aisin Seiki Kabushiki Kaisha, Kariya, Japan

[21] Appl. No.: 08/950,788

[22] Filed: Oct. 15, 1997

[30] Foreign Application Priority Data

Oct. 23, 1996 [JP] Japan .................................... 8-281088

[51] Int. Cl.$^6$ .................................................. F16H 61/12
[52] U.S. Cl. .......................... 475/127; 475/116; 475/128; 477/906
[58] Field of Search ..................................... 475/116, 123, 475/127, 128, 131, 133; 477/906

[56] References Cited

U.S. PATENT DOCUMENTS

| | | | |
|---|---|---|---|
| 4,896,568 | 1/1990 | Gierer .................................. | 477/906 X |
| 4,995,285 | 2/1991 | Hayakawa et al. .................. | 477/906 X |
| 5,538,479 | 7/1996 | Niiyama .................................. | 475/128 |
| 5,601,506 | 2/1997 | Long et al. ........................... | 477/906 X |

FOREIGN PATENT DOCUMENTS 63-210443  9/1988  Japan .

*Primary Examiner*—Charles A. Marmor
*Assistant Examiner*—Sherry Lynn Estremsky
*Attorney, Agent, or Firm*—Burns, Doane, Swecker & Mathis, L.L.P.

[57] ABSTRACT

In an automatic transmission of an automotive vehicle equipped with a change-speed gear train capable of selectively establishing first-speed to fourth-speed drive power trains, there are provided first and second solenoid valves each in the form of a normally open valve arranged to be supplied with fluid under pressure at its output fluid passage in a deactivated condition, third and fourth solenoid valves each in the form of a normally closed valve arranged to permit fluid under pressure discharged from its output fluid passage in a deactivated condition, a first spool valve for fail-safe arranged to disengage a first hydraulic brake of the change-speed gear train when all the solenoid valves are supplied with the fluid under pressure at their output fluid passages or when the fourth solenoid valve and either one of the first, second and third solenoid valves are supplied with the fluid under pressure at their output fluid passages, and a second spool valve for fail-safe arranged to disengage a second hydraulic brake of the change-speed gear train when the first and fourth solenoid valves are supplied with the fluid under pressure at their output fluid passages.

4 Claims, 4 Drawing Sheets

Fig.2

| SHIFT RANGE | | OPERATION OF CLUTCH AND BRAKE | | | | | ACTIVATION OF SOLENOID VALVE | | | |
|---|---|---|---|---|---|---|---|---|---|---|
| | | C1 | C2 | B0 | B1 | B2 | NORMALLY OPEN | | NORMALLY CLOSED | |
| | | | | | | | SOL1 | SOL2 | SOL3 | SOL4 |
| P | | ○ | | | | | × | × | × | × |
| R | | ○ | | | | ○ | × | × | × | × |
| N | | ○ | | | | | × | × | × | × |
| D | 1 | ○ | | | ○ | | × | ○ | ○ | × |
| | 2 | | ○ | | ○ | | ○ | × | ○ | × |
| | 3 | ○ | ○ | | | | × | × | × | × |
| | 4 | | ○ | ○ | | | ○ | × | × | ○ |

Fig.4

| SHIFT RANGE | | OPERATION OF CLUTCH AND BRAKE | | | | ACTIVATION OF SOLENOID VALVE | | |
|---|---|---|---|---|---|---|---|---|
| | | C1 | C2 | B1 | B2 | NORMALLY OPEN | | NORMALLY CLOSED |
| | | | | | | SOL1 | SOL2 | SOL3 |
| P | | ○ | | | | × | × | × |
| R | | ○ | | | ○ | × | × | × |
| N | | ○ | | | | × | × | × |
| D | 1 | ○ | | ○ | | × | ○ | ○ |
| | 2 | | ○ | ○ | | ○ | × | ○ |
| | 3 | ○ | ○ | | | × | × | × |

HYDRAULIC CONTROL APPARATUS FOR AUTOMATIC TRANSMISSION

BACKGROUND OF THE INVENTION

1. Field of the Invention

The present invention relates to a hydraulic control apparatus for an automatic transmission of an automotive vehicle.

2. Description of the Prior Art

In Japanese Patent Laid-open Publication No. 63-210443, there has been proposed a hydraulic control apparatus for an automatic transmission of the type which has a change-speed gear train composed of first and second hydraulic clutches and first and second hydraulic brakes. The hydraulic control apparatus includes first, second, third and fourth solenoid valves respectively for controlling fluid under pressure supplied to and discharged from the first hydraulic clutch, for controlling fluid under pressure supplied to and discharged from the second hydraulic clutch, for controlling fluid under pressure supplied to and discharged from the first hydraulic brake, and for controlling fluid under pressure supplied to and discharged from the second hydraulic brake. In the automatic transmission, the change-speed gear train establishes a first drive power train when the first hydraulic clutch and brake are activated under control of the first and third solenoid valves, a second drive power train when the first hydraulic clutch and second hydraulic brake are activated under control the first and fourth solenoid valves, a third drive power train when the first and second hydraulic clutches are activated under the first and second solenoid valves, and a fourth drive power train when the second hydraulic clutch and brake are activated under control of the second and fourth solenoid valves.

In such a conventional hydraulic control apparatus for an automatic transmission, all the solenoid valves each are in the form of a normally open valve which is supplied with fluid under pressure at its output fluid passage in a deactivated condition, and there are provided a first spool valve for fail-safe for disengaging the first hydraulic brake in a condition where at least one of the first, second and fourth solenoid valves is supplied with fluid under pressure at its output fluid passage and a second spool valve for fail-safe for disengaging the second hydraulic brake when at least one of the second, third and fourth solenoid vales is supplied with fluid under pressure at its output fluid passage. In operation, if all the solenoid valves are deactivated due to disconnection of an electric power supply system, the first hydraulic brake is disengaged under control of the first spool valve, the second hydraulic brake is disengaged under control of the second spool valve, and only the first and second hydraulic clutches are engaged to establish the third drive power train. If in such an instance, at least one of the first and second spool valves fails to disengage either one of the first and second hydraulic brakes, the third drive power train may not be established.

SUMMARY OF THE INVENTION

In view of the problem described above, a primary object of the present invention is directed to provide a hydraulic control apparatus for the automatic transmission capable of establishing the third drive power train regardlessly of disconnection of the electric power supply system for the solenoid valves.

According to the present invention, the object is accomplished by providing a hydraulic control apparatus for an automatic transmission having a change-speed gear train including first and second hydraulic clutches and first and second hydraulic brakes, the control apparatus including first, second, third and fourth solenoid valves respectively for controlling fluid under pressure supplied to and discharged from the first hydraulic clutch, for controlling fluid under pressure supplied to and discharged from the second hydraulic clutch, for controlling fluid under pressure supplied to and discharged from the first hydraulic brake, and for controlling fluid under pressure supplied to and discharged from the second hydraulic brake, in which the change-speed gear train establishes a first-speed drive power train by engagement of the first hydraulic clutch and brake, a second-speed drive power train by engagement of the first hydraulic brake and the second hydraulic clutch, a third-speed drive power train by engagement of the first and second hydraulic clutches, and a fourth-speed drive power train by engagement of the second hydraulic clutch and brake, wherein the first and second solenoid valves each are in the form of a normally open valve which is supplied with the fluid under pressure at its output fluid passage in a deactivated condition, and the third and fourth solenoid valves each are in the form of a normally closed valve which permits the fluid under pressure discharged therefrom at its output fluid passage in a deactivated condition, and wherein the hydraulic control apparatus comprises a first spool valve for fail-safe arranged to disengage the first hydraulic brake when all the first, second and third solenoid valves are supplied with the fluid under pressure at their output fluid passages or when the fourth solenoid valve and either one of said first, second and third solenoid valves are supplied with the fluid under pressure at their output fluid passages and a second spool valve for fail-safe arranged to disengage the second hydraulic brake when the first and fourth solenoid valves are supplied with the fluid under pressure at their output fluid passages.

According to an aspect of the present invention, there is provided a hydraulic control apparatus for an automatic transmission having a change-speed gear train including first and second hydraulic clutches and a hydraulic brake, the control apparatus including first, second and third solenoid valves respectively for controlling fluid under pressure supplied to and discharged from the first hydraulic clutch, for controlling fluid under pressure supplied to and discharged from the second hydraulic clutch, and for controlling fluid under pressure supplied to and discharged from the first hydraulic brake, in which the change-speed gear train establishes a first-speed drive power train by engagement of the first hydraulic clutch and brake, a second-speed drive power train by engagement of the first hydraulic brake and the second hydraulic clutch, and a third-speed drive power train by engagement of the first and second hydraulic clutches, wherein the first and second solenoid valves each are in the form of a normally open valve which is supplied with the fluid under pressure at its output fluid passage in a deactivated condition, and the third solenoid valve is in the form of a normally closed valve which permits the fluid under pressure discharged therefrom at its output fluid passage in a deactivated condition, and wherein the hydraulic control apparatus comprises a spool valve for fail-safe arranged to disengage the first hydraulic brake when all the first, second and third solenoid valves are supplied with the fluid under pressure at their output fluid passages.

BRIEF DESCRIPTION OF THE DRAWINGS

Other objects, features and advantages of the present invention will be more readily appreciated from the following detailed description of preferred embodiments thereof when taken together with the accompanying drawings, in which:

FIG. 2 is a table indicative of relative operation of hydraulic clutches, brakes and solenoid valves shown in FIG. 1;

FIG. 4 is a table indicative of relative operation of hydraulic clutches, brakes and solenoid valves shown in FIG. 3.

DESCRIPTION OF THE PREFERRED EMBODIMENTS

Figure 1:
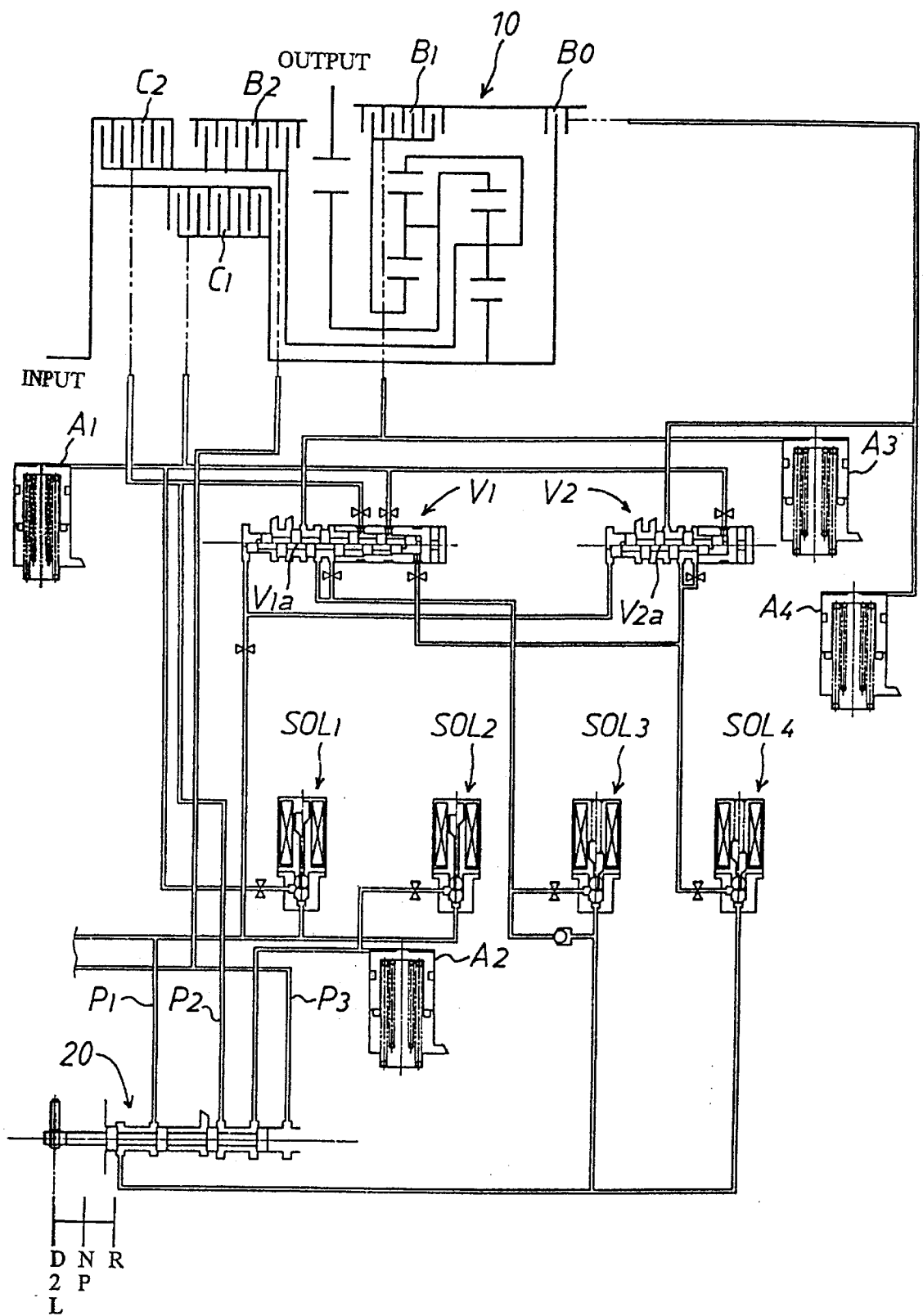
FIG. 1 illustrates an embodiment of a hydraulic control apparatus for an automatic transmission of an automotive vehicle in accordance with the present invention.

Referring now to the drawings, FIG. 1 illustrates an embodiment of a hydraulic control apparatus for an automatic four-speed transmission of an automotive vehicle in accordance with the present invention. The automatic transmission has a change-speed gear train 10 including first and second hydraulic clutches C1 and C2, first and second hydraulic brakes B1 and Bo, and a hydraulic brake B2 for reverse drive which are operated under control of a manual shift valve 20, first to fourth solenoid valves SOL1, SOL2, SOL3 and SOL4, and first and second spool valves V1 and V2. In such an arrangement, the first and second solenoid valves SOL1 and SOL2 are directly supplied at their input fluid passages with fluid under line pressure modulated by a regulator valve (not shown) in a usual manner, and the third and fourth solenoid valves SOL3 and SOL4 are supplied at their input fluid passages with the fluid under line pressure under control of the manual shift valve 20. The solenoid valves SOL1–SOL4 are connected at their output fluid passages to hydraulic accumulators A1–A4, respectively.

The change-speed gear train 10 is applied at its input side with drive power from a prime mover of the vehicle through a torque converter (not shown) to output the drive power at its output side. As shown by an operation table in FIG. 2, the change-speed gear train 10 establishes a first-speed drive power train in response to engagement of the first hydraulic clutch C1 and brake B1 and establishes a second-speed drive power train in response to engagement of the second hydraulic clutch C2 and first hydraulic brake B1. The change-speed gear train 10 further establishes a third-speed drive power train in response to engagement of the first and second hydraulic clutches C1 and C2, a fourth-speed drive power train in response to engagement of the second hydraulic clutch C2 and brake Bo, and a reverse drive power train in response to engagement of the first hydraulic clutch C1 and the hydraulic brake B2 for reverse drive. In the operation table shown in FIG. 2, each circle sign in the left-hand frame represents engaged conditions of the hydraulic clutches and brakes, each circle sign in the right-hand frame represents activated conditions of the solenoid valves, and each X sign in the right-hand frame represents deactivated conditions of the solenoid valves.

The manual shift valve 20 is arranged to be selectively shifted to a first position for a drive range "D", a second range "2" or a low range "L", a second position for a neutral range "N" or a parking range "P", and a third position for a reverse drive range "R" as shown in FIG. 1. When shifted to the first position, the shift valve 20 is retained to connect a line pressure passage P1 to each input fluid passage of the third and fourth solenoid valves SOL3 and SOL4 and to connect the output fluid passage of second solenoid valve SOL2 to a fluid passage P2 in connection to the second hydraulic clutch C2. When shifted to the second position, the shift valve 20 is retained to interrupt the communication between the line pressure passage P1 and each input fluid passage of the third and fourth solenoid valves SOL3, SOL4 and to interrupt the communication between the output fluid passage of second solenoid valve SOL2 and fluid passages P2, P3. The fluid passage P3 is connected to the regulator valve (not shown) to feedback hydraulic pressure to the regulator valve. When shifted to the third position, the shift valve 20 is retained to interrupt the communication between the line pressure passage P1 and each input fluid passage of the third and fourth solenoid valves SOL3, SOL4 and to connect the output fluid passage of second solenoid valve SOL2 to the fluid passage P3 in connection to the second hydraulic brake B2.

The solenoid valves SOL1–SOL4 are selectively activated or deactivated under control of an electric control apparatus (not shown) in accordance with driving conditions of the vehicle. The first solenoid valve SOL1 is in the form of a normally open valve which is applied with the line pressure at its output fluid passage in a deactivated condition for controlling fluid under pressure supplied to and discharged from the first hydraulic clutch C1 regardless of a shifted position of the manual shift valve 20. The second solenoid valve SOL2 is also in the form of a normally open valve which is arranged to control fluid under pressure supplied to and discharged from the second hydraulic clutch C2 when the shift valve 20 is shifted to the first position for the drive range "D", second range "2" or low range "L" and to control fluid under pressure supplied to and discharged from the hydraulic brake B2 of reverse drive when the shift valve 20 is shifted to the third position for the reverse range R. The third solenoid valve SOL3 is in the form of a normally closed valve which is arranged to discharge fluid under pressure therefrom at its output fluid passage in a deactivated condition for controlling fluid under pressure supplied to and discharged from the first hydraulic brake BH when the shift valve 20 is shifted to the first position for the drive range "D", second range "2" or low range "L". The fourth solenoid valve SOL4 is also in the form of a normally closed valve which is arranged to control fluid under pressure supplied to and discharged from the second hydraulic brake Bo when the shift valve is shifted to the first position for the drive range "D", second range "2" or low range "L".

The first spool valve V1 has a spool V1a which is applied with the line pressure at its left-hand end to be normally retained in a first position shown by an upper half thereof in FIG. 1. When the first, second and third solenoid valves SOL1, SOL2, SOL3 are supplied with the fluid under pressure at their output fluid passages or either one of the solenoid valves SOL1–SOL4 is supplied with the fluid under pressure at its output fluid passage, the spool V1a is moved against the line pressure toward a second position shown by a lower half thereof shown in FIG. 1 to disengage the first hydraulic brake B1. The second spool valve V2 has a spool V2a which is applied with the line pressure at its left-hand end to be normally retained in a first position shown by an upper half thereof in FIG. 1. When the first and fourth solenoid valves SOL1 and SOL4 are supplied with fluid under pressure at their output fluid passages, the spool V2a acts to disengage the second hydraulic brake Bo.

Assuming that the first and fourth solenoid valves SOL1, SOL4 have been deactivated and that the second and third solenoid valves SOL2, SOL3 have been activated in a condition where the shift valve 20 is retained in the first position for the drive range "D", second range "2" or low range "L", the first and third solenoid valves SOL1 and SOL3 are supplied with the fluid under pressure at their output fluid passages, while the second and fourth solenoid valves SOL2 and SOL4 may not be supplied with the fluid under pressure at their output fluid passages. As a result, the first hydraulic clutch C1 and brake B1 are engaged, while the second hydraulic clutch C2 and brake Bo and the hydraulic brake B2 for reverse drive are disengaged. This causes the change-speed gear train 10 to establish a first drive power train. In such an instance, the first spool valve V1 does not act to disengage the first hydraulic brake B1.

When the second and fourth solenoid valves SOL2 and SOL4 are deactivated while the first and third solenoid valves SOL1 and SOL3 are activated in a condition where the shift valve 20 is retained in the first position for the drive range "D", second range "2" or low range "L", the second and third solenoid valves SOL2 and SOL3 are supplied with the fluid under pressure at their output fluid passages, while the first and fourth solenoid valves SOL1 and SOL4 may not be supplied with the fluid under pressure at their output fluid passages. As a result, the second hydraulic clutch C2 and first brake B1 are engaged, while the first hydraulic clutch C1, second hydraulic brake Bo and the hydraulic brake B2 for reverse drive are disengaged. This causes the change-speed gear train 10 to establish a second drive power train. In such an instance, the first spool valve V1 for fail-safe does not act to disengage the first hydraulic brake B1.

When all the solenoid valves SOL1–SOL4 are deactivated in a condition where the shift valve 20 is retained in the first position for the drive range "D", second range "2" or low range "L", the first and second solenoid valves SOL1 and SOL2 are supplied with the fluid under pressure at their output fluid passages, while the third and fourth solenoid valves SOL3 and SOL4 may not be supplied with the fluid under pressure at their output fluid passages. As a result, the first and second hydraulic clutches C1 and C2 are engaged regardlessly of operation of the first and second spool valves V1 and V2, while the first and second hydraulic brakes B1 and Bo and the hydraulic brake B2 for reverse drive are disengaged. This causes the change-speed gear train 10 to establish a third drive power train.

When the second and third solenoid valves SOL2 and SOL3 are deactivated while the first and fourth solenoid valves SOL1 and SOL4 are activated in a condition where the shift valve 20 is retained in the first position for the drive range "D", second range "2" or low range "L", the second and fourth solenoid valves SOL2 and SOL4 are supplied with the fluid under pressure at their output fluid passages while the first and third solenoid valves SOL1 and SOL3 may not be supplied with the fluid under pressure at their output fluid passages. As a result, the second hydraulic clutch C2 and brake Bo are engaged, while the first hydraulic clutch C1 and brake B1 and the hydraulic brake B2 for reverse drive are disengaged. This causes the change-speed gear train 10 to establish a fourth drive power train. In such an instance, the second spool valve V2 does not act to disengage the second hydraulic brake Bo.

When all the solenoid valves SOL1–SOL4 are deactivated in a condition where the shift valve 20 is retained in the third position for the reverse drive range "R", the first and second solenoid valves SOLL and SOL2 are supplied with the fluid under pressure at their output fluid passages, while the third and fourth solenoid valves SOL3 and SOL4 may not be supplied with the fluid under pressure at their output fluid passages. In such an instance, the first hydraulic clutch C1 and the hydraulic brake B2 for reverse drive are engaged regardlessly of operation of the first and second spool valves V1 and V2 for fail-safe, while the second hydraulic clutch C2 and the first and second hydraulic brakes B1 and Bo are disengaged. This causes the change-speed gear train 10 to establish a reverse drive power train. Even if in this instance, the shift valve 20 is shifted in an error to the third position for the reverse drive range R while the vehicle is traveling at a high speed in a condition where the shift valve 20 is retained in the first position for the drive range D, the hydraulic brake B2 for the reverse drive is disengaged by activation of the second solenoid valve SOL2 or the first hydraulic clutch C1 is disengaged by activation of the first solenoid valve SOL1 to avoid establishment of the reverse drive power train.

If all the solenoid valves SOL1–SOL4 are deactivated in a condition where the shift valve 20 is retained in the second position for the neutral range "N" or parking range "P", the first and second solenoid valves SOL1 and SOL2 are supplied with the fluid under pressure at their output fluid passages, while the third and fourth solenoid valves SOL3 and SOL4 may not be supplied with the fluid under pressure at their output fluid passages. In such an instance, only the first hydraulic clutch C1 is engaged since the communication between the output fluid passage of second solenoid SOL2 and the fluid passages P2, P3 is interrupted by the shift valve 20. As a result, the change-speed gear train in retained in neutral condition without establishing any drive power train.

As is understood from the above description, the change-speed gear train 10 acts to establish the third drive power train when all the solenoid valves SOL1–SOL4 are deactivated in a condition where the shift valve 20 is retained in the first position for the drive range "D", second range "2" or low range "L". With such an arrangement, even if all the solenoid valves SOL1–SOL4 are deactivated due to disconnection of the electric power supply system in a condition where the vehicle is traveling at the first, second or fourth speed, the change-speed gear train 10 acts to establish the third drive power train regardlessly of operation of the first and second spool valves V1 and V2 for fail-safe. Thus, even if in such an instance, the spool valves V1 and V2 fail to cause movement of their spools V1a, V2, the change-speed gear train 10 establishes the third drive power train in a reliable manner to ensure traveling of the vehicle.

If the first and second solenoid valves SOL1 and SOL2 are deactivated due to failure of the electric control apparatus while the third and fourth solenoid valves SOL3 and SOL4 are activated in a condition where the shift valve 20 is retained in the first position of the drive range "D", second range "2" or low range "L", all the solenoid valves SOL1–SOL4 are supplied with the fluid under pressure at their output fluid passages such that the spool V1a of the first spool valve V1 for fail-safe is moved to the second position to disengage the first hydraulic brake B1 and that the spool V2a of the second spool valve V2 for fail-safe is moved to the second position to disengage the second hydraulic brake Bo. In the occurrence of such failure, the first and second hydraulic clutches C1 and C2 are brought into engagement under control of the spool valves V1 and V2, while the first and second hydraulic brakes B1 and Bo and the hydraulic brake B2 for reverse drive are disengaged. This causes the change-speed gear train 10 to establish the third drive power train.

If the first, second and third solenoid valves SOL1, SOL2 and SOL3 are deactivated due to failure of the electric control apparatus while only the fourth solenoid valve SOL4 is activated in a condition where the shift valve 20 is retained in the first position, the first, second and fourth solenoid valves SOL1, SOL2 and SOL4 are supplied with the fluid under pressure at their output fluid passages except for the third solenoid valve SOL3 such that the spool V1a of the first spool valve V1 for fail-safe is moved to the second position to disengage the first hydraulic brake B1 and that the spool V2a of the second spool valve V2 is moved to the second position to disengage the second hydraulic brake B0. In the occurrence of such failure, the first and second hydraulic clutches C1 and C2 are brought into engagement under control of the spool valves V1 and V2, while the first and second hydraulic brakes B1 and Bo and the hydraulic brake B2 for reverse drive are disengaged. This causes the change-speed gear train to establish the third drive power train.

If the first, second and fourth solenoid valves SOL1, SOL2 and SOL4 are deactivated due to failure of the electric control apparatus while only the third solenoid valve SOL3 is activated in a condition where the shift valve 20 is retained in the first position. the solenoid valves SOL1, SOL2 and SOL3 are supplied with the fluid under pressure at their output fluid passages except for the fourth solenoid valve SOL4 such that the spool V1a of the first spool valve V1 is moved to the second position to disengage the first hydraulic brake B1 and that the spool V2a of the second spool valve V2 is moved to the second position to disengage the second hydraulic brake B0. In the occurrence of such failure, the first and second hydraulic clutches C1 and C2 are brought into engagement under control of the spool valves V1 and V2, while the first and second hydraulic brakes B1 and B0 and the hydraulic brake B2 for reverse drive are disengaged. This causes the change-speed gear train to establish the third drive power train.

If the second solenoid valve SOL2 is deactivated due to failure of the electric control apparatus while the first, third and fourth solenoid valves SOL1, SOL3, SOL4 are activated in a condition where the shift valve 20 is retained in the first position, the solenoid valves SOL2, SOL3, SOL4 are supplied with the fluid under pressure at their output fluid passages except for the first solenoid valve SOL1 such that the spool V1a of the first spool valve V1 is moved to the second position to disengage the first hydraulic brake B1 and that the spool V2a of the second spool valve V2 is retained in the first position to engage the second hydraulic brake B0. In the occurrence of such failure, the second hydraulic clutch C2 and brake B0 are brought into engagement under control of the first spool valve V1, while the first hydraulic clutch C1 and brake B1 and the hydraulic brake B2 are disengaged. This causes the change-speed gear train 10 to establish the fourth drive power train.

If all the solenoid valves SOL1–SOL4 are activated due to failure of the electric control apparatus in a condition where the shift valve 20 is retained in the first position of the drive range "D", second range "2" or low range "L", the third and fourth solenoid valves SOL3 and SOL4 are supplied with the fluid under pressure at their output fluid passages such that the spool V1a of first spool valve V1 for fail-safe is moved to the second position to disengage the first hydraulic brake B1 and that the spool V2a of second spool valve V2 for fail-safe is retained in the first position to engage the second hydraulic brake B0. In the occurrence of such failure, the second hydraulic brake B0 is engaged under control of the second spool valve V2, while the first and second hydraulic clutches C1, C2, the first hydraulic brake B1 and the hydraulic brake B2 for reverse drive are disengaged. As a result, the change-speed gear train 10 is retained in the neutral position without establishing any drive power train.

If the first solenoid valve SOL1 is deactivated due to failure of the electric control apparatus while the second, third and fourth solenoid valves SOL2, SOL3 and SOL4 are activated in a condition where the shift valve 20 is retained in the first position for the drive range "D", second range "2" or low range "L", the first, third and fourth solenoid valves SOL1, SOL3 and SOL4 are supplied with the fluid under pressure at their output fluid passages such that the spool V1a of first spool valve V1 is moved to the second position to disengage the first hydraulic brake B1 and that the spool V2a of second spool valve V2 is moved to the second position to disengage the second hydraulic brake B0. In the occurrence of such failure, the first hydraulic clutch C1 is brought into engagement under control of the first and second spool valves V1 and V2, while the first hydraulic brake B1, the second hydraulic clutch C2 and brake B0 and the hydraulic brake B2 for reverse drive are disengaged. As a result, the change-speed gear train 10 is retained in the neutral position without establishing any drive power train.

If the first and third solenoid valves SOL1 and SOL3 are deactivated due to failure of the electric control apparatus while the second and fourth solenoid valves SOL2 and SOL4 are activated in a condition where the shift valve 20 is retained in the first position, the first and fourth solenoid valve SOL1 and SOL4 are supplied with the fluid under pressure at their output fluid passages such that the spool V1a of first spool valve V1 is moved to the second position to disengage the first hydraulic brake B1 and that the spool V2a of second spool valve V2 is moved to the second position to disengage the second hydraulic brake B0. In the occurrence of such failure, the first hydraulic clutch C1 is engaged under control of the first and second spool valves V1 and V2, while the second hydraulic clutch C2, the first and second hydraulic brakes B1 and B0 and the hydraulic brake B2 for reverse drive are disengaged. As a result, the change-speed gear train is retained in the neutral condition without establishing any drive power train.

If the fourth solenoid valve SOL4 is deactivated due to failure of the electric control apparatus while the first, second and third solenoid valves SOL1, SOL2 and SOL3 are activated in a condition where the shift valve 20 is retained in the first position for the drive range "D", second range "2" or low range "L", only the third solenoid valve SOL3 is supplied with the fluid under pressure at its output fluid passage such that both the spools V1a, V2a of spool valves V1, V2 each are retained in the first position. In the occurrence of such failure, the first hydraulic brake B1 is engaged, while the first hydraulic clutch C1, the second hydraulic clutch C2 and brake B0 and the hydraulic brake B2 for reverse drive are disengaged. As a result, the change-speed gear train 10 is retained in the neutral position without establishing any drive power train.

If the third solenoid valve SOL3 is deactivated due to failure of the electric control apparatus while the first, second and fourth solenoid valves SOL1, SOL2 and SOL4 are activated in a condition where the shift valve 20 is retained in the first position for the drive range "D", second range "2" or low range "L", only the fourth solenoid valve SOL4 is supplied with the fluid under pressure at its output fluid passage such that both the spools V1a, V2a of spool valves V1, V2 each are retained in the first position. In the occurrence of such failure, the second hydraulic brake B0 is engaged, while the first and second hydraulic clutches C1 and C2, the first hydraulic brake B1 and the hydraulic brake B2 for reverse drive are disengaged. As a result, the change-speed gear train 10 is retained in the neutral position without establishing any drive power train.

If the third and fourth solenoid valves SOL3 and SOL4 are deactivated due to failure of the electric control apparatus while the first and second solenoid valves SOL1 and SOL2 are activated in a condition where the shift valve 20 is retained in the first position, all the solenoid valves SOL1–SOL4 may not be supplied with the fluid under pressure at their output passages such that both the spools V1a, V2a of spool valves V1, V2 each are retained in the first position. In the occurrence of such failure, the first and second hydraulic clutches C1 and C2, the first and second hydraulic brakes B1 and B0 and the hydraulic brake B2 for reverse drive are disengaged. As a result, the change-speed gear train 10 is retained in the neutral position without establishing any drive power train.

If the second, third and fourth solenoid valves SOL2, SOL3 and SOL4 are deactivated due to failure of the electric control apparatus while only the first solenoid valve SOL1 is activated in a condition where the shift valve 20 is retained in the first position, only the second solenoid valve SOL2 is supplied with the fluid under pressure at its output fluid passage such that both the spools V1a, V2a of spool valves V1, V2 each are retained in the first position. In the occurrence of such failure, the second hydraulic clutch C2 is brought into engagement under control of the first and second spool valves V1 and V2, while the first hydraulic clutch C1 and brake B1, the second hydraulic brake B0 and the hydraulic brake B2 for reverse drive are disengaged. As a result, the change-speed gear train 10 is retained in the neutral position without establishing any drive power train.

If the first, third and fourth solenoid valves SOL1, SOL3 and SOL4 are deactivated due to failure of the electric control apparatus while the second solenoid valve SOL2 is activated in a condition where the shift valve 20 is retained in the first position, only the first solenoid valve SOL1 is supplied with the fluid under pressure at its output fluid passage such that both the spools V1a, V2a of spool valves V1, V2 each are retained in the first position. In the occurrence of such failure, the first hydraulic clutch C1 is engaged under each inoperative condition of the spool valves V1, V2, while the first hydraulic brake B1, the second hydraulic clutch C2 and brake B0 and the hydraulic brake B2 for reverse drive are disengaged. As a result, the change-speed gear train 10 is retained in the neutral condition without establishing any drive power train.

Figure 3:
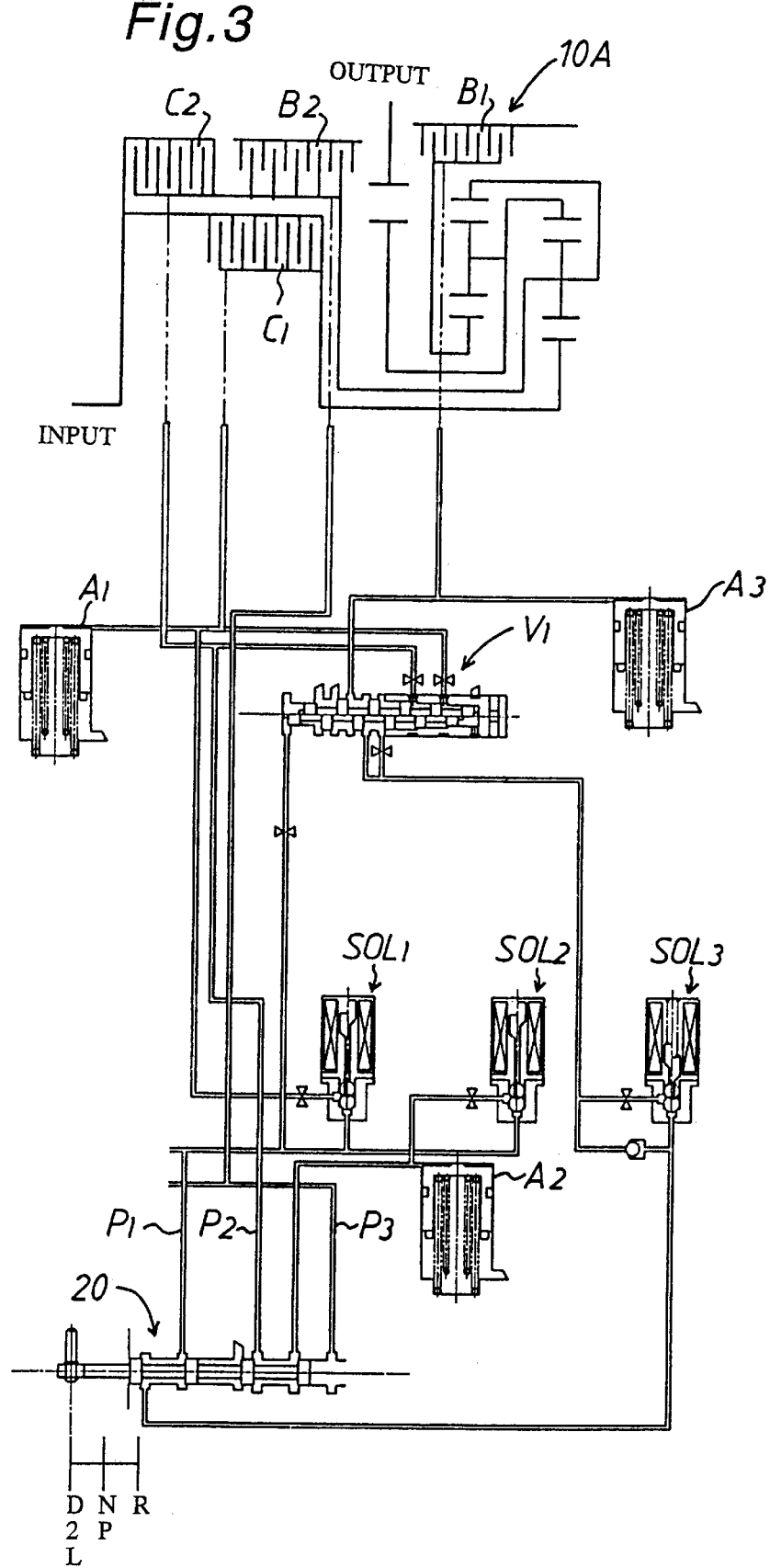
FIG. 3 is another embodiment of a hydraulic control apparatus for an automatic transmission in accordance with the present invention.

In the hydraulic control apparatus for the four-speed automatic transmission, the second hydraulic brake B0, the fourth solenoid valve SOL4, the second spool valve V2 and the accumulator A4 may be removed to provide a three-speed automatic transmission as shown in FIG. 3, wherein the first and second hydraulic clutches C1 and C2, the first hydraulic brake B1 and the hydraulic brake B2 for reverse drive are operated under control of the manual shift valve 20, the first, second and third solenoid valves SOL1, SOL2, SOL3 and the first spool valve V1 for fail-safe. In the three-speed automatic transmission, the first and second solenoid valves SOL1 and SOL2 are directly supplied with the fluid under line pressure at their input fluid passages, the third solenoid valve SOL3 is supplied with the fluid under line pressure under control of the manual shift valve 20, and the accumulators A1–A3 are disposed respectively within the output fluid passages of the solenoid valves SOL1–SOL3.

As shown by an operation table in FIG. 4, the change-speed gear train 10 selectively establishes a first-speed drive power train in response to engagement of the first hydraulic clutch C1 and brake B1, a second-speed drive power train in response to engagement of the second hydraulic clutch C2 and first hydraulic brake B1, a third-speed drive power train in response to engagement of the first and second hydraulic clutches C1 and C2, and a reverse drive power train in response to engagement of the first hydraulic clutch C1 and the hydraulic brake B2 for reverse drive. In the operation table shown in FIG. 4, each circle sign in the left-hand frame represents engaged conditions of the hydraulic clutches and brakes, each circle sign in the right-hand frame represents activated conditions of the solenoid valves, and each X sign in the right-hand frame represents deactivated conditions of the solenoid valves.

When shifted to the first position for the drive range "D", second "2" or low range "L", the shift valve 20 is retained to connect the line pressure passage P1 to the input fluid passage of the third solenoid valve SOL3 and to connect the output fluid passage of second solenoid valve SOL2 to the fluid passage P2 in connection to the second hydraulic clutch C2. When shifted to the third position for the reverse drive range "R", the shift valve 20 is retained to interrupt the communication between the line pressure passage P1 and the input fluid passage of the third solenoid valve SOL3 and to connect the output fluid passage of the second solenoid valve SOL2 to the fluid passage P3 in connection to the second hydraulic brake B2. When shifted to the second position for the neutral range "N" or parking range "P", the shift valve 20 is retained to interrupt the communication between the line pressure passage P1 and the input fluid passage of the third solenoid valve SOL3 and to interrupt the communication between the output fluid passage of second solenoid valve SOL2 and the fluid passages P2, P3. When all the solenoid valves SOL1–SOL3 are supplied with the fluid under pressure at their output fluid passages due to failure of the electric control apparatus, the spool V1a of first spool valve V1 is moved against the line pressure toward the second position to disengage the first hydraulic brake B1.

If the first solenoid valve SOL1 is deactivated due to failure of the electric control apparatus while the second and third solenoid valves SOL2 and SOL3 are activated in a condition where the shift valve 20 is retained in the first position, the first and third solenoid valves SOL1 and SOL3 are supplied with the fluid under pressure at their output fluid passages, while the second solenoid valve SOL2 may not be supplied with the fluid under pressure at its output fluid passage. As a result, the first hydraulic clutch C1 and brake B1 are engaged, while the second hydraulic clutch C2 and the hydraulic brake B2 for reverse drive are disengaged. This causes the change-speed gear train 10 to establish a first-speed drive power train. In such an instance, the first spool valve V1 does not act to disengage the first hydraulic brake B1.

If the second solenoid valve SOL2 is deactivated due to failure of the electric control apparatus while the first and third solenoid valves SOL1 and SOL3 are activated in a condition where the shift valve 20 is retained in the first position, the second and third solenoid valves SOL2 and SOL3 are supplied with the fluid under pressure at their output fluid passages, while the first solenoid valve SOL1 may not be supplied with the fluid under pressure at its output fluid passage. As a result, the first hydraulic brake B1 and the second hydraulic clutch C2 are engaged, while the first hydraulic clutch C1 and the hydraulic brake B2 for reverse drive are disengaged. This causes the change-speed gear train 10 to establish the second-speed drive power train. In such an instance, the first spool valve V1 does not act to disengage the first hydraulic brake B1.

If all the solenoid valves SOL1–SOL3 are deactivated due to failure of the electric control apparatus in a condition where the shift valve 20 is retained in the first position, the first and second solenoid valves SOL1 and SOL2 are supplied with the fluid under pressure at their output fluid passages, while the third solenoid valve SOL3 may not be supplied with the fluid under pressure at its output fluid passage. In such an instance, the first and second hydraulic clutches C1 and C2 are engaged regardlessly of operation of the first spool valve V1 for fail-safe, while the first hydraulic brake B1 and the hydraulic brake B2 for reverse drive are disengaged. This causes the change-speed gear train to establish a third-speed drive power train.

If all the solenoid valves SOL1–SOL3 are deactivated due to failure of the electric control apparatus in a condition where the shift valve 20 is retained in the third position for the reverse drive range R, the first and second solenoid valves SOL1 and SOL2 are supplied with the fluid under pressure at their output fluid passages, while the third solenoid valve SOL3 may not be supplied with the fluid under pressure at its input and output fluid passages. In such an instance, the first hydraulic clutch C1 and the hydraulic brake B2 for reverse drive are engaged regardless of operation of the first spool valve V1 for fail-safe, while the first hydraulic brake B1 and the second hydraulic clutch C2 are disengaged. This causes the change-speed gear train 10A to establish a reverse drive power train.

If all the solenoid valves SOL1–SOL3 are deactivated due to failure of the electric control apparatus in a condition where the shift valve 20 is retained in the second position for the neutral range N and parking range P, the first and second solenoid valves SOL1 and SOL2 are supplied with the fluid under pressure at their output fluid passages, while the third solenoid valve SOL3 may not be supplied with the fluid under pressure at its input and output fluid passages. In such an instance, only the first hydraulic clutch C1 is engaged since the output fluid passage of the second solenoid valve SOL2 is disconnected from the fluid passages P1 and P3 by means of the manual shift valve 20. As a result, the change-speed gear train 10 is retained in the neutral condition without establishing any drive power train.

As is understood from the above description, the change-speed gear train 10A acts to establish the third-speed drive power train when all the solenoid valves SOL1–SOL3 are deactivated in a condition where the shift valve 20 is retained in the first position for the drive range "D", second range "2" or low range "L". Thus, even if all the solenoid valves SOL1–SOL3 are deactivated due to failure of the electric control apparatus in a condition where the vehicle is traveling at the first-speed or second-speed, the third-speed drive power train is established by the change-speed gear train 10A regardlessly of operation of the first spool valve V1 for fail-safe. Accordingly, in the occurrence of disconnection of the electric power supply system for the solenoid valves SOL1–SOL3 or failure of the first spool valve V1 in operation caused by sticking of its spool V1a, the third-speed drive power train is established by the change-speed gear train 10A in a reliable manner to ensure traveling of the vehicle at the third-speed.

In the case that the second hydraulic brake B0, the fourth solenoid valve SOL4, the second solenoid valve V2 and the accumulator A4 shown in FIG. 1 are added to the hydraulic control apparatus for the three-speed automatic transmission shown in FIG. 3, the common component parts can be adapted to provide the four-speed automatic transmission.

What is claimed is:

1. An automatic transmission comprising a change-speed gear train and a hydraulic control apparatus, the change-speed gear train including first and second hydraulic clutches, and a hydraulic brake, with said change-speed gear train establishing a first-speed drive power train by engagement of said first hydraulic clutch and said first hydraulic brake, a second-speed drive power train by engagement of said second hydraulic clutch and said second hydraulic brake and a third-speed drive power train by engagement of said first and second hydraulic clutches;

the hydraulic control apparatus including first, second and third solenoid valves respectively for controlling fluid under pressure supplied to and discharged from said first hydraulic clutch, for controlling fluid under pressure supplied to and discharged from said second hydraulic clutch, and for controlling fluid under pressure supplied to and discharged from said hydraulic brake, and a spool valve for fail-safe arranged to disengage said first hydraulic clutch when all of said first, second and third solenoid valves are supplied with the fluid under pressure at their output fluid passages, said first and second solenoid valves each being in the form of a normally open valve, and said third solenoid valve being in the form of a normally closed valve.

2. A hydraulic control apparatus for an automatic transmission as claimed in claim 1, wherein upon failure of all said solenoid valves in activation, said first and second hydraulic clutches are engaged under control of said first and second solenoid valves regardless of operation of said spool valve to establish the third-speed drive power train.

3. An automatic transmission comprising a change-speed gear train and a hydraulic control apparatus, the change-speed gear train including first and second hydraulic clutches, and first and second hydraulic brakes, said change-speed gear train establishing a first-speed drive power train by-engagement of said first hydraulic clutch and first hydraulic brake, a second-speed drive power train by engagement of said first hydraulic brake and said second hydraulic clutch, a third-speed drive power train by engagement of said first and second hydraulic clutches and a fourth-speed drive power train by engagement of said second hydraulic clutch and second hydraulic brake:

the hydraulic control Apparatus including first, second, third and fourth solenoid valves respectively for controlling fluid under pressure supplied to and discharged from said first hydraulic clutch, for controlling fluid under pressure supplied to and discharged from said second hydraulic clutch, for controlling fluid under pressure supplied to and discharged from said first hydraulic brake, and for controlling fluid under pressure supplied to and discharged from said second hydraulic brake, the hydraulic control apparatus also including a first spool valve for fail-safe arranged to disengage said first hydraulic clutch when all of said first, second and third solenoid valves are supplied with the fluid under pressure at their output fluid passages or when said fourth solenoid and either one of said first, second and third solenoid valves are supplied with the fluid under pressure, and a second spool valve for fail-safe arranged to disengage said second hydraulic brake when said first and fourth solenoid valves are supplied with the fluid under pressure at their output fluid passages, said first and second solenoid valves each being in the form of a normally open valve and said third and fourth solenoid valves being in the form of a normally closed valve.

4. A hydraulic control apparatus for an automatic transmission as claimed in claim 3, wherein upon of failure of all said solenoid valves in activation, said first and second hydraulic clutches are engaged under control of said first and second solenoid valves regardless of operation of said first and second spool valves to establish the third-speed drive power train.

* * * * *